United States Patent
Taylor et al.

(10) Patent No.: US 8,595,758 B2
(45) Date of Patent: *Nov. 26, 2013

(54) DEVICE PROVISIONING

(75) Inventors: Kevin Taylor, Littleton, CO (US); Richard Woundy, North Reading, MA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/785,190

(22) Filed: May 21, 2010

(65) Prior Publication Data

US 2010/0228838 A1    Sep. 9, 2010

Related U.S. Application Data

(63) Continuation of application No. 10/599,498, filed as application No. PCT/US2005/011481 on Apr. 5, 2005, now Pat. No. 7,827,573.

(60) Provisional application No. 60/559,554, filed on Apr. 5, 2004.

(51) Int. Cl.
*H04N 7/16*    (2011.01)
*G06F 15/173*   (2006.01)

(52) U.S. Cl.
USPC .............. 725/25; 725/143; 725/144; 709/223

(58) Field of Classification Search
USPC ......................................................... 725/80
See application file for complete search history.

(56) References Cited

U.S. PATENT DOCUMENTS

| 6,151,626 | A   |   | 11/2000 | Tims et al. |   |
|---|---|---|---|---|---|
| 6,389,453 | B1 | * | 5/2002  | Willis ........................... | 709/204 |
| 6,637,027 | B1 |   | 10/2003 | Bresblauer et al. |   |
| 7,080,397 | B2 |   | 7/2006  | Cochran et al. |   |
| 7,188,161 | B1 | * | 3/2007  | O'Neil et al. ................. | 709/220 |
| 7,251,820 | B1 |   | 7/2007  | Jost et al. |   |
| 7,526,568 | B1 | * | 4/2009  | Swanton et al. .............. | 709/239 |
| 2001/0042107 | A1 | * | 11/2001 | Palm ............................ | 709/218 |
| 2002/0116721 | A1 | * | 8/2002  | Dobes et al. .................. | 725/129 |
| 2002/0129359 | A1 |   | 9/2002  | Lichner |   |
| 2003/0004880 | A1 | * | 1/2003  | Banerjee et al. ................ | 705/51 |

(Continued)

FOREIGN PATENT DOCUMENTS

| WO | 0059203 | 10/2000 |
|---|---|---|
| WO | 0143418 | 6/2001 |
| WO | 0152543 | 7/2001 |

OTHER PUBLICATIONS

Search Report from PCT/US2005/011481 mailed Oct. 1, 2008.

*Primary Examiner* — Justin Shepard
(74) *Attorney, Agent, or Firm* — Banner & Witcoff, Ltd.

(57) ABSTRACT

A method and system of provisioning a set-top box (STB) with a STB provisioning system are provided which include storing STB profile information in a provisioning datastore, receiving a customer order at a service provisioning system, notifying a billing system of the customer order, and notifying a conditional access system of the customer order. The method and system further include storing information from the customer order in a provisioning datastore, notifying a video device manager about the STB, and delivering a cable operator configuration message from the video device manager to the STB, the configuration message being based on information from the provisioning datastore, thereby provisioning the STB without essential involvement of the conditional access system.

18 Claims, 2 Drawing Sheets

(56) References Cited

U.S. PATENT DOCUMENTS

| | | |
|---|---|---|
| 2003/0035540 A1 | 2/2003 | Freeman et al. |
| 2003/0056210 A1 | 3/2003 | Joshi et al. |
| 2004/0168184 A1 | 8/2004 | Steenkamp et al. |
| 2004/0177368 A1* | 9/2004 | Pelkey et al. .................. 725/25 |
| 2004/0181800 A1 | 9/2004 | Rakib et al. |
| 2004/0261092 A1* | 12/2004 | Addington et al. ............. 725/25 |
| 2004/0268420 A1* | 12/2004 | Addington et al. ............ 725/146 |
| 2005/0031108 A1 | 2/2005 | Eshun et al. |
| 2005/0097610 A1* | 5/2005 | Pedlow et al. .................. 725/80 |
| 2005/0149729 A1* | 7/2005 | Zimmer et al. ............... 713/168 |

* cited by examiner

DEVICE PROVISIONING

CROSS-REFERENCE TO RELATED APPLICATIONS

This application is a continuation of U.S. patent application Ser. No. 10/599,498 entitled "Method and System for Provisioning a Set-Top Box," which is a national phase filing of international application No. PCT/US05/011481 filed Apr. 5, 2005 and entitled "Method and System for Provisioning a Set-Top Box," which claims priority to U.S. provisional application No. 60/559,554 filed Apr. 5, 2004 and entitled "Method and System for Provisioning a Set-Top Box," the entire disclosures of which are herein incorporated by reference.

BACKGROUND OF THE INVENTION

1. Field of the Invention

The invention relates to a method and system for provisioning a set-top box (STB). The invention further relates to content distribution networks for audio and video programming that involve conditional access systems and set-top boxes.

2. Background Art

In a traditional STB provisioning system, the billing system provides all order functionality, and the conditional access controller provides all STB authorization and configuration management functionality. More specifically, any STB configuration parameters must be supported by the conditional access controller software and signaling protocols. This arrangement, although suitable in many applications, limits flexibility in deploying new services that involve the STB.

There are also traditional high speed data provisioning systems. These high speed data provisioning systems tend to treat the devices being provisioned as commodity devices (for example, DOCSIS cable modems). As such, these traditional high speed data provisioning systems do not differentiate among devices.

SUMMARY OF THE INVENTION

It is an object of the invention to provide an improved method and system for provisioning a set-top box (STB) that allows for greater flexibility in implementing STB features. The invention comprehends arrangements that enable STB provisioning independently of the conditional access system. In this way, some STB configuration parameters may be configured without requiring support from the conditional access controller software and signaling protocols. This provides greater flexibility at the STB. This also allows the provisioning system to differentiate among STB devices.

In carrying out the invention, a method and system for provisioning an STB are provided. Comprehended features include enabling common provisioning of STBs independently of the conditional access system, incorporating hardware and software profile information (including, for example, product certification) for STBs manufactured by one or more vendors, and accepting customer orders from retail affiliates and/or user activation websites.

At a more detailed level, the invention involves various different aspects. A method and system for provisioning an STB utilize a STB provisioning system. The system receives STB profile information, STB certification information and STB customer orders. It is appreciated that the information and orders received by the system may be presented in any suitable way. The STB profile information and STB certification information are preferably instantiated as XML formatted documents. An STB profile import tool imports the STB profile information and STB certification information. The imported information is stored in a provisioning datastore.

The STB customer orders are preferably instantiated as XML formatted documents. A service provisioning system receives the STB customer orders.

A number of provisioning activities take place after an STB customer order is received. In more detail, the service provisioning system checks the customer order and notifies the billing system. The billing system notifies the conditional access controller. In an alternative, the service provisioning system directly notifies the conditional access controller. Information relating to the STB device and customer order is stored in the provisioning datastore. The device manager and video device manager are notified about the STB device.

The video device manager delivers the cable operator information to the STB in the customer's home. Any suitable delivery mechanism may be used to deliver the configuration to the STB from the video device manager. Further, a preferred format for the configuration data uses XML.

It is appreciated that the invention comprehends a collection of innovations that may be used together in various arrangements to achieve STB configuration/provisioning independently of the conditional access mechanism. Many various implementations of the concepts of the invention are possible.

It is appreciated that the various components discussed herein including the STB profile import tool, provisioning datastore, service provisioning system, billing system, conditional access controller, video device manager and IP device manager may be implemented in any suitable way as appreciated by one of ordinary skill in the relevant art. For example, various software and hardware devices may be utilized in the implementation of the components.

DETAILED DESCRIPTION OF THE PREFERRED EMBODIMENT

Figure 1:
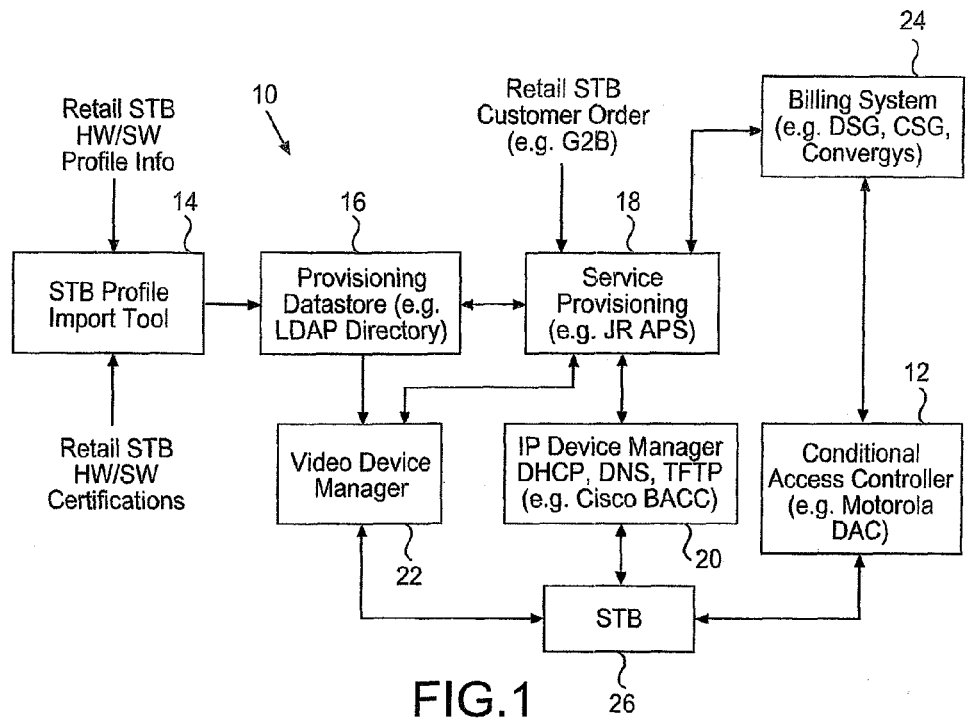
FIG. 1 illustrates a STB provisioning system according to the present invention with the service provisioning system interacting with the conditional access controller via the billing system.
Figure 3:
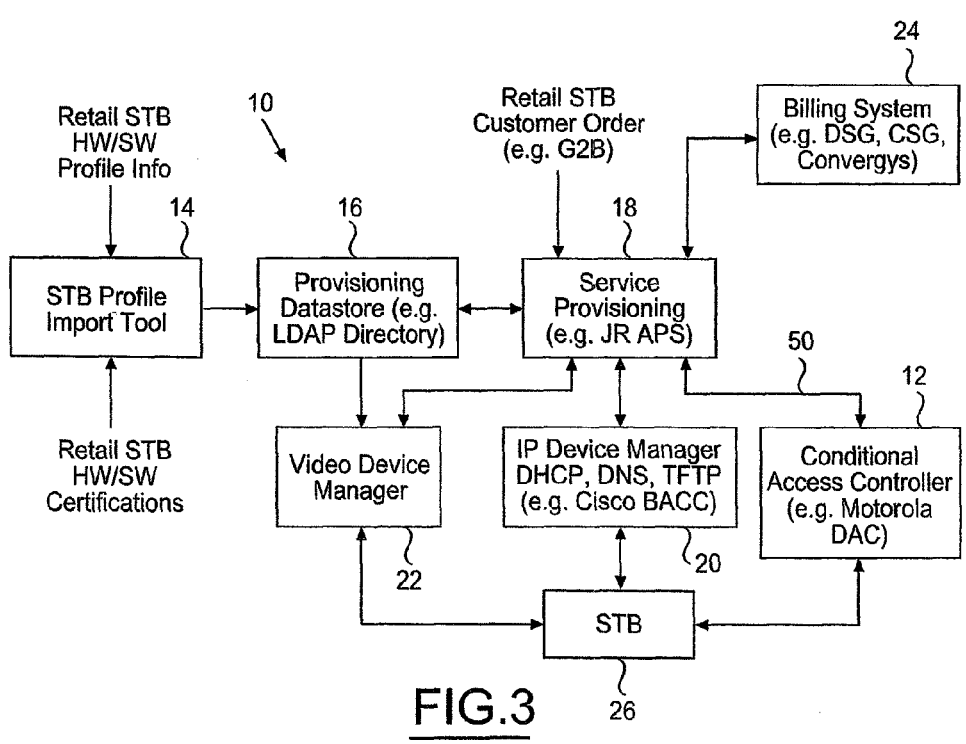
FIG. 3 illustrates a STB provisioning system according to the present invention with the service provisioning system interacting directly with the conditional access controller.
Figure 2:
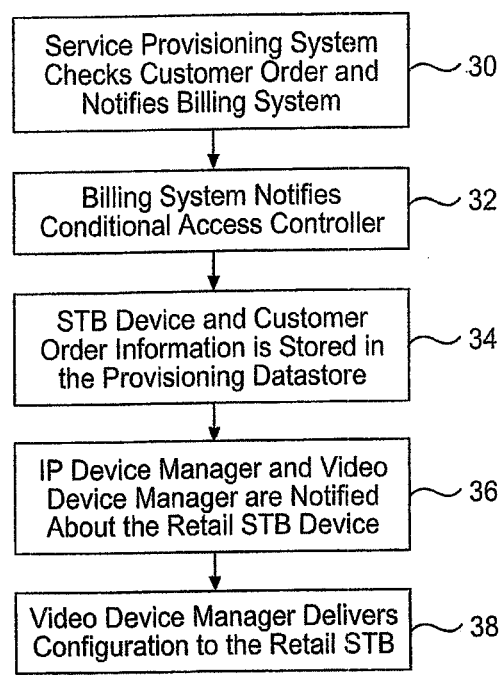
FIG. 2 illustrates a method of the invention.

FIGS. 1-3 illustrate the preferred embodiment of the invention. Accordingly, these detailed features are the preferred features, and other embodiments consistent with the concepts of the invention are possible.

FIG. 1 illustrates a STB provisioning system 10 that enables configuration of STBs 26 independently of the STB conditional access (CA) system 12. System 10 includes STB profile import tool 14, provisioning datastore 16, service provisioning system 18, device manager 20, and video device manager 22. Billing system 24 and STB 26 are also shown.

There are at least three sources of input into the STB provisioning system 10, namely, STB profile information, STB certification information and STB customer orders.

Profile information may include generic make and model identification, hardware and software image identification, available STB interfaces (for example, network, video, audio), hardware capabilities (for example, hard drive characteristics), and software capabilities (for example, multilingual support). The ultimate source of STB information is the manufacturer, although this information may be redistributed by others as appropriate.

STB certifications by CABLELABS and/or the cable operator may be granted to a particular STB hardware make/model and software image version. Certification may also be granted for a particular subset of interfaces and hardware/software capabilities that have been implemented in the STB 26. For the cable operator, certification may imply operator support for the generic and vendor-specific features in the STB profiles.

Customer orders may include customer address and contact information, device information (for example, make and model, serial number, MAC address, software image version), CABLECARD device information (if applicable), and a list of one or more cable operator services to enable for the STB 26 (for example, analog/digital tiers, premium channels, interactive services, Internet access). Customer orders may originate from retailer kiosks, affiliates, or a cable operator's own STB activation website for customer self-provisioning.

The STB profile information and STB certification information are instantiated as XML formatted documents (using a well-known XML schema definition that permits vendor extensions). These XML documents are transmitted to the operator as email attachments, as documents that are uploaded to a cable operator web portal, or as data in a web services API invocation (or any alternative EDI transaction). The XML documents are ultimately submitted to the STB profile import tool 14, which imports the XML document information with knowledge of the document source—for example, the import tool might ignore certification attributes in an STB profile XML document that was received from a previously unknown manufacturer. The STB profile information and STB certification information are stored in the provisioning datastore 16.

The STB customer orders are instantiated as XML over HTTPS posts to a cable operator web portal (HTTPS provides TLS authentication and encryption of the HTTP transport protocol). Unlike the STB profile information and STB certification information, the STB customer orders are processed in real-time (or in near real-time). The cable operator web portal forwards each STB customer order to the service provisioning system 18.

Once the service provisioning system 18 has received the customer order, a number of provisioning activities occur. As best shown in FIG. 2, at block 30, the service provisioning system 18 verifies that the customer order is syntactically correct. Further, the service provisioning system verifies the serviceability of the customer order, ensuring that the desired cable services are available at the customer's home location. The service provisioning system 18 also verifies that the STB device information (make, model, and software image version) corresponds to an approved, certified device, and verifies the CABLECARD device information (if applicable). With further reference to block 30, the service provisioning system 18 notifies the billing system 24 of the new customer order. The customer's desired cable operator services are translated to billing system rate codes or service codes (depending on the billing vendor). At block 32, the billing system 24 notifies the conditional access controller 12 of the new customer order. The rate codes or service codes are translated to authorizations in the conditional access system. At block 34, the service provisioning system 18 stores the STB device information (and CABLECARD device information, if applicable) and other customer order information in the provisioning datastore 16. At block 36, the service provisioning system 18 notifies the IP device manager 20 and video device manager 22 about the STB device 26 (and CABLECARD device, if applicable).

An alternative STB provisioning system is shown in FIG. 3, in which the service provisioning system 18 directly notifies (link 50) the conditional access controller 12 of the new customer order.

Referring again to FIG. 2, a key component in the STB configuration of the present invention is the video device manager (VDM) 22. The video device manager 22 delivers cable operator configuration to the STB 26 in the customer's home using XML over HTTP/HTTPS, as well as using XML over a UDP-based protocol (block 38).

The VDM messages use a well-known XML schema definition that permits vendor extensions, similar to the XML schema definition for STB profile information—this approach enables straightforward configuration of vendor-specific features in the vendor-specific portions of the STB profile. Additional information items in the XML configuration messages include SCTE 18 Emergency Alert Signaling (EAS) configuration of the STB geographical location (state_code, county_code, and county_subdivision), and possibly SCTE 65 Service Information (SI) configuration of the appropriate Master Guide Table for the STB (map_id) to enable multiple channel lineups. The authoritative source of the STB configuration information for the VDM 22 is the provisioning datastore 16, which has been previously populated by the service provisioning system 18.

There are at least three delivery mechanisms from the VDM 22 to the STB 26.

In a first mechanism, the VDM 22 uses bi-directional IP unicast messaging (e.g. XML over HTTPS) to send the configuration to the STB 26. This mechanism relies on a functioning bidirectional network between the VDM 22 and the STB 26, but it enables STB acknowledgment of the new configuration. The VDM 22 discovers the IP address of the STB 26 via DNS lookups (using the device serial number or MAC address as the DNS hostname), leveraging the DNS server within the IP Device Manager 20.

In a second mechanism, the VDM 22 uses uni-directional IP multicast messaging (e.g. XML over a UDP-based protocol) to send the configuration to the STB via a DOCSIS Set-top Gateway (DSG) Broadcast Tunnel. Because acknowledgments may be unreliable or non-existent, the VDM 22 sends such messages multiple times. All DSG-aware STBs receive such DSG Broadcast Tunnel messages, so each XML message encodes the unique device information (e.g. serial number or MAC address) corresponding to the intended message target.

In a third mechanism, at boot-time, the STB 26 requests configuration information from the VDM 22, assuming bidirectional IP unicast messaging (e.g. XML over HTTPS over TCP). The STB 26 discovers the DNS hostname (or IP address) of the VDM 22 from its DOCSIS initialization process (e.g. via a DHCP option or sub-option value). The VDM 22 determines the source STB 26 by reverse-resolving the source IP address into the DNS hostname (which refers to the device serial number or MAC address) via DNS lookups. By leveraging this message exchange, the STB 26 does not have to store its configuration information in nonvolatile storage—although leveraging NVRAM might provide more reliable service to the customer.

The targeted STB devices at this time for embodiments of the invention are proprietary DOCSIS STBs and OPEN-CABLE Advanced Host devices. In the former case, it is assumed that the proprietary STB software image includes a (lab certified) application that manages the XML protocol exchanges with the VDM 22. In the latter case, it is assumed that the OCAP Monitor App manages the XML protocol exchanges with the VDM.

In another aspect of the illustrated implementation, the video device manager 22 may enable Internet access on the STB 26, if the customer order includes a request for Internet service, and if the STB hardware/software profile indicates that the STB 26 includes an Ethernet and/or USB data port that has been certified for Internet operation. The video device manager 22 would include configuration information (in its XML over HTTP(S) or in its XML over UDP message) that signals the STB 26 to enable its Ethernet or USB data port, which may be electrically shut off by default. With the Ethernet/USB data port enabled, and with the appropriate DOCSIS configuration in the STB 26 (handled separately by the IP Device Manager 20), the customer can plug in a computer or game station and obtain Internet access.

It is appreciated that embodiments of the invention enable the cable operator to accommodate many new STB manufacturers and platforms, and to selectively partner with manufacturers to enable innovative STB features in a timely fashion. Embodiments of the invention ease the deployment of DOCSIS STBs (proprietary STBs and advanced hosts), and ease the deployment of standardized EAS and SI.

Embodiments of the invention have numerous advantages over a traditional provisioning system. Embodiments of the invention greatly enhance the cable operator's ability to configure new features on new STB vendor platforms. The video device manager 22 can support vendor-specific configuration parameters through provisioning datastore data and through server configuration.

Embodiments of the invention enable the cable operator to accommodate many new STB manufacturers that are offering many new STB interfaces and capabilities, while assisting the operator to track which interfaces and capabilities can be enabled and managed by the operator. Embodiments of the invention enable the cable operator to accept customer orders from consumer electronic retailers, rather than forcing the customer to call the operator directly. Embodiments of the invention enable the cable operator to configure SCTE 18 CEAS and SCTE 65 (SI) parameters in a standard fashion, independent of the conditional access system in place. Embodiments of the invention ease the integration of STB and DOCSIS device provisioning systems into one holistic provisioning system.

It is appreciated that embodiments of the invention are suitable for provisioning a retail STB but are also suitable for provisioning a leased STB or any other STB. Further, XML is appropriate for presenting information in embodiments of the invention but other techniques and formats could be used. It is also to be appreciated that the drawings illustrate examples for the implementation of the illustrated functionality but this is done only to facilitate an understanding of the concepts involved and one skilled in the art may implement a system or method in a variety of ways.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   receiving a request from a device such that the request includes instructions for a process in which the device, during initialization, discovers a DNS hostname or IP address of a content device manager;
   determining a device geographical location by reverse-resolving a device IP address into a DNS hostname via DNS lookups; and
   transmitting, to the device, a configuration message that includes first information related to configuration of the device geographical location.

2. The method of claim 1 further comprising:
   receiving device certification information relating to the device; and
   storing the device certification information in a provisioning datastore.

3. The method of claim 2, further comprising: receiving the device certification information as a mark-up language document.

4. The method of claim 3, further comprising: receiving the mark-up language document as an XML-formatted document.

5. The method of claim 1 further comprising: receiving device profile information.

6. The method of claim 1, further comprising: receiving an order as an XML document.

7. The method of claim 6 further comprising:
   notifying a billing system of the order.

8. The method of claim 6 further comprising:
   transmitting a notification of the order to a conditional access system.

9. The method of claim 1 further comprising:
   notifying a data device manager about the device.

10. The method of claim 1 further comprising: transmitting the configuration message to the device as an XML document.

11. The method of claim 1 further comprising: transmitting, to the device, the configuration message that includes second information to enable multiple channel lineups.

12. The method of claim 1 further comprising: transmitting the configuration message using bi-directional unicast messaging.

13. The method of claim 1 further comprising: transmitting the configuration message using uni-directional multicast messaging.

14. A method comprising:
   receiving a request from a device such that the request includes instructions for a process in which the device, during initialization, discovers a DNS hostname or IP address of a content device manager;
   determining a device geographical location by reverse-resolving a device IP address into a DNS hostname via DNS lookups; and
   transmitting, to the device, a configuration message that includes first information related to configuration of the device geographical location as a first mark-up language document.

15. The method of claim 14 further comprising:
   receiving an order in a second mark-up language document; and
   notifying a billing system of the order.

16. The method of claim 15, further comprising: receiving the second mark-up language document as an XML-formatted document.

17. A system comprising:
 a service provisioning system configured to receive device profile information; and
 a content device manager configured to receive a request from a device, wherein the request includes instructions for a process in which the device, during initialization, discovers a DNS hostname or IP address of the content device manager, the content device manager further configured to determine a device geographical location by reverse-resolving a device IP address into a DNS hostname via DNS lookups, wherein the content device manager is further configured to transmit a configuration message to the device, wherein the configuration message to the device includes first information related to configuration of the device geographical location.

18. The system of claim 17 wherein the configuration message to the device enables Internet access to the device.

* * * * *